Figure 1:
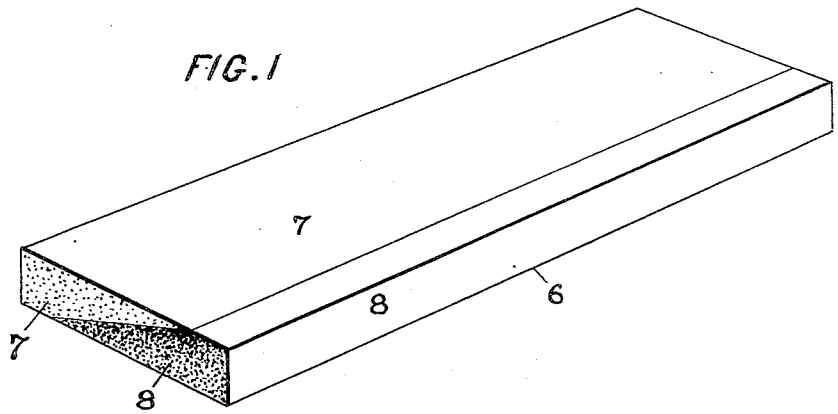

Oct. 14, 1924.

A. E. GIBSON 1,511,459

COMPOSITE MATERIAL FROM WHICH ARTICLES MAY BE MOLDED

Original Filed May 3, 1922

Inventor
Albert E. Gibson.
By [signature]
Attorney.

Patented Oct. 14, 1924.

1,511,459

UNITED STATES PATENT OFFICE.

ALBERT E. GIBSON, OF PHILADELPHIA, PENNSYLVANIA, ASSIGNOR TO THE DENTISTS' SUPPLY COMPANY, A CORPORATION OF NEW YORK.

COMPOSITE MATERIAL FROM WHICH ARTICLES MAY BE MOLDED.

Original application filed May 3, 1922, Serial No. 558,069. Divided and this application filed August 24, 1923. Serial No. 659,072.

*To all whom it may concern:*

Be it known that I, ALBERT E. GIBSON, a citizen of the United States, and resident of Philadelphia, county of Philadelphia, and State of Pennsylvania, have invented an Improvement in Composite Materials from Which Articles May be Molded, of which the following is a specification.

My invention has for its object the preparation of a blank, the material of which is preferably in sheet or strip form, from which artificial teeth and other articles may be stamped or pressed, the blank being of a plurality of grades of material (such as of different colors) relatively positioned in the structure of the blank so that when the article is vitrified, it will provide a unitary structure with different colors or shades blended to a more or less extent, but shading from one tint or color gradually into the next tint or color.

This application is a division of my application Serial No. 558,069, filed May 3, 1922, for a method for forming molded objects, and is especially directed to that portion of the invention described in the application relating to the material from which the objects are molded.

In another pending application of mine, Serial No. 537,157, filed February 17, 1922, I have set out a process and apparatus for securing final results of the same general character as herein contemplated, but in that case the articles were made from mixtures of different materials in powdered or granular form fed into the molds in a loose condition and thereafter compressed to the proper shape and homogeneity in respect to density.

In the present case, the materials are first prepared in the form of sheets or strips in which the different shades or colors are incorporated with a uniformity along the length of the strip, the said strip being preferably slightly plastic and adapted to be subjected to stamping and molding operations, whereby a series of duplicated articles, such as artificial teeth, may be successively stamped from and formed of the said strip material, and wherein each article so formed is composed in its make-up of portions of the differently colored or shaded substance of the strip, said articles being in this respect substantially identical.

Considering the subject of this invention more particularly in respect to the making of artificial teeth, it is necessary to provide a porcelain body portion of relatively darker material than the front and incisor portion which are composed of lighter and more transparent porcelain. Heretofore, the materials composing the light and dark portions of the teeth were first prepared in a more or less pasty condition and then introduced into the mold successively by hand, and subsequently compressed and baked preliminary to the final vitrifying operation. The process, as heretofore carried on, is relatively slow and, moreover, is liable to provide more or less irregularity and dissimilarity in the shading of the teeth when, on the other hand, they should be duplicates of each other.

The composite strips or sheets may be accurately prepared in a very simple manner and as the mechanical stamping operation is a mere function of the machine requiring no intelligence on the part of the operator, it is manifest that not only may the teeth be rapidly and cheaply produced, but accurate and satisfactory results may be obtained by the employment of unskilled labor. Furthermore, I am enabled to subject the material of which the article is made to great pressure whereby it is so compacted that it is brought to a strong molded shape and may be readily handled for the final fusing or vitrifying operation without the necessity of a preliminary baking operation, as has heretofore been necessary with hand molded teeth before they could be removed from the molds.

With the above and other objects in view, the nature of which will be more fully understood from the description hereinafter, the invention consists in the novel composite material from which articles may be molded, as hereinafter more fully described and defined in the claims.

Referring to the drawings: Fig. 1 is a perspective view showing a sheet or strip of composite material embodying my invention and from which teeth or other articles may be stamped and molded; and Fig. 2 is a vertical section illustrating dies in the act of stamping artificial teeth from the strip material shown in Fig. 1.

Primarily, it is essential that the composite strip 6 be provided for employment with the various molding means shown, and a simple construction of the strip is illustrated in Fig. 1 and comprises two longitudinal overlapping strips 7 and 8, each of which is a trapezoid in cross section and with the oblique faces of the strips contacting and preferably uniting so that the entire composite strip 6 is of an integral structure. The strip is made up of bisk material, such as employed in the manufacture of artificial teeth, and is essentially composed of feldspar with more or less coloring matter and a slight admixture of a suitable binder sufficient to hold the feldspar in definite form both in the bar shape and when stamped up into the tooth forms preliminary to the ultimate vitrification under high temperature. In the particular construction shown, the material 7 of the strip is relatively lighter than the material 8, the latter being intended to form the main body and back of the tooth but blending into the lighter material 7 at what constitutes the upper or root end of the tooth, whereas the lighter material 8 overlaps the darker material 8 to constitute the lighter and more transparent portion of the incisor end of the tooth as well as a large portion of the frontal surface, as will be more fully understood by explanations hereinafter to be given. For convenient employment in connection with stamping or pressing dies, it is desirable that the composite strip be made sufficiently plastic that it will maintain its continuity while being stamped in the dies when forming the tooth forms.

Figure 2:
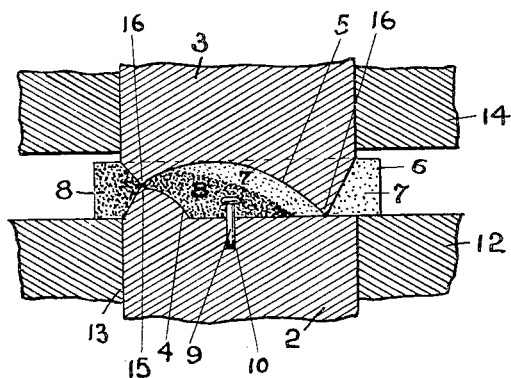

A simple example of dies, suitable for stamping objects such as artificial teeth from the composite strip, is illustrated in Fig. 2, in which 2 and 3 are the two die portions which cooperate for stamping out and compressing the material of the composite strip. The die 2 is guided vertically in a frame 13 terminating at the top in a table portion 12 upon which the strip may be supported and guided between the dies. The upper die 3 is guided in a frame portion 14 so that it is alined with the die 2 and by suitable mechanism, said dies may be simultaneously operated in opposite directions, or the lower die may remain stationary and the upper die moved downward toward it or vice versa, as preferred. When the die portions are shaped to stamp artificial tooth shapes from the composite material, the under part 5 of the die 3 may be hollowed or shaped to correspond to the front or buccal portion of the tooth, whereas the upper surface 4 of the die 2 may be shaped to correspond to the back or lingual portion of the tooth. In the case of this die, a socket 10 may be provided in which a pin 9 may be supported so as to be molded into the composite material as shown, or the pin may be shaped merely to hold an anchor as is customary in soldered pin teeth, wherein the anchor may be held within the tooth body and into which the pin may be subsequently soldered, as is well known in the art of manufacturing artificial teeth. The edges 15 of the die 2 and 16 of the die 3 which surround the molding spaces 4 and 5 may be of such shape as will penetrate the material so that the part thereof which constitutes the tooth structure will be severed from the remaining portion of the strip, as will be understood by reference to Fig. 2. In this figure, the two parts 7 and 8 correspond to the parts 7 and 8 of the material of the strip 6 of Fig. 1, the part 7 constituting the lighter color or frontal part of the bisk body of the tooth, whereas the part 8 constitutes the main body or darker portion of the material. When this tooth structure thus formed is subsequently vitrified, the materials 7 and 8 blend more or less into each other.

More particularly referring to the preferred materials constituting the composition of the article molded, the same may be composed of feldspar, kaolin and silex, except for the coloring metallic oxides employed in the two parts for providing the desired shades. In the compositions employed for making artificial teeth, the part 7 of the composite strip would ordinarily have little or no coloring matter, whereas the part 8 of said strip would be provided with the necessary oxides to give the darker shade which is to provide the shading for the end of the tooth most distant from the incisor part, mainly, that portion which comes adjacent to the gums. In making up the compositions to enter into the production of the strip 6, it will be understood that aside from the mixture of the earthy or mineral matters, there should be mixed with them small quantities of a suitable binder, such as is provided by a solution of gum arabic, sugar water, rosin, wax, dextrine or other equivalent vegetable matter or any mixture of them desired, so that when the materials are mixed and more or less compressed in shaping the strips 7 and 8 or the composite strip as a whole, the materials will maintain their shape with sufficient rigidity to be properly handled and, moreover, to insure the parts 7 and 8 adhering to each other. In commercial practice, it is desirable that the strips be of a more or less ductile form (without being plastic), so that in the action of the die, the tendency is to compress and compact the material during the shaping operation under the influence of the dies without any tendency to brittleness. Subsequently, the materials are subjected to a thorough drying and vitrification.

While I have described the nature and use of my improved composite sheet or strip, more particularly in its adaptation for the manufacture of artificial teeth by the apparatus and method more fully described in my application Serial No. 558,069, herein before referred to, and of which this application is a division, it is to be understood that the composite sheet or strip may be employed in the production of cameos in which case the cross sectional forms of the parts 7 and 8 may be more or less varied. In such cases, the overlapping of the two characters of material 7 and 8 may each be of the full width of the composite strip, such, for example, as providing a dark backing of the full width with a thin surface layer of the lighter material also the full width, the surface of the upper die being shaped or formed to make the proper intaglio or relief impressions. In the case of cameo productions, the vitrification may also be carried out by subsequent treatment to high temperature, and such cameo effects may be utilized either for jewelry or for buttons, etc.

Further considering my invention from a broader standpoint, the overlapping or superimposed material may be of various compositions of a yielding nature and subjected to dies in a similar manner to that hereinbefore described, the only difference being that the substances may be of other than those capable of vitrification, such, for example, as compositions formed of an earthy material mixed with a binder which may be softened by heat sufficient to permit the stamping and shaping of the articles by the dies in a rapid succession and wherein the materials treated provide the different layers to insure the variation in shade or coloring effect.

It will now be apparent that I have devised a novel and useful composite sheet strip or bar of material from which articles may be stamped preliminary to vitrification which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:

1. A composite strip from which to stamp articles in duplicate, consisting of two bodies of different materials arranged as overlapping strips in juxtaposition along their length, but in which the strips of different material project laterally in opposite directions relatively to the portions in juxtaposition.

2. The invention according to claim 1, wherein the two bodies are each composed of a vitrifying of materials capable of vitrifying and welding together under the application of heat, and in which further, one of said bodies contains coloring oxides to distinguish it in color or shade from the other.

3. A composite strip comprising two longitudinal strips of substantially trapezoidal cross section, said strips of yielding material having their oblique surfaces in adhering juxtaposition.

4. The invention according to claim 3, wherein the two strips forming the composite strip are respectively composed of mixtures of feldspar, kaolin and silex, and one of them also provided with a coloring oxide to give to it a pronouncedly different shade or color as compared to that of the other strip.

5. A composite sheet or strip from which to stamp articles in duplicate, consisting of two bodies of different materials arranged so that one overlies the other, said bodies respectively formed of materials adapted to be vitrified and welded together by the application of heat, said bodies differing in shade or coloring matter to provide a characteristic distinction in their exposed surfaces in the finished vitrified article made therefrom.

In testimony of which invention, I hereunto set my hand.

ALBERT E. GIBSON.